(12) United States Patent
Liu et al.

(10) Patent No.: US 11,120,251 B2
(45) Date of Patent: Sep. 14, 2021

(54) FACE CAPTURING METHOD AND RELATED APPARATUS

(71) Applicant: Shenzhen Intellifusion Technologies Co., Ltd., Guangdong (CN)

(72) Inventors: Haijun Liu, Guangdong (CN); Peng Gu, Guangdong (CN); Le Chen, Guangdong (CN)

(73) Assignee: Shenzhen Intellifusion Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/257,307

(22) PCT Filed: Oct. 31, 2019

(86) PCT No.: PCT/CN2019/114728
§ 371 (c)(1),
(2) Date: Dec. 31, 2020

(87) PCT Pub. No.: WO2020/134548
PCT Pub. Date: Jul. 2, 2020

(65) Prior Publication Data
US 2021/0232804 A1 Jul. 29, 2021

(30) Foreign Application Priority Data

Dec. 28, 2018 (CN) .......................... 201811628404.X

(51) Int. Cl.
*G06K 9/00* (2006.01)
(52) U.S. Cl.
CPC ..... *G06K 9/00255* (2013.01); *G06K 9/00288* (2013.01)

(58) Field of Classification Search
None
See application file for complete search history.

(56) References Cited

U.S. PATENT DOCUMENTS

| | | | |
|---|---|---|---|
| 8,864,581 B2 * | 10/2014 | Leyvand | A63F 9/24 463/30 |
| 10,218,937 B2 * | 2/2019 | Wang | G06F 3/0481 |
| 10,733,587 B2 * | 8/2020 | Chandrasekaran | G06K 9/00288 |

(Continued)

FOREIGN PATENT DOCUMENTS

| CN | 108063914 A | * | 5/2018 |
|---|---|---|---|
| CN | 108063914 A | | 5/2018 |

*Primary Examiner* — Delomia L Gilliard

(57) ABSTRACT

A face capturing method and a related apparatus that are applicable to an electronic apparatus. The method includes: analyzing a captured first video stream to obtain a plurality of images (101); determining a first pattern including a plurality of first codes (102); buffering images of first frame numbers, corresponding to the first codes indicating images to be buffered, to buffers in sequence (103); when buffering the images, determining a second pattern including a plurality of second codes (104); buffering images of second frame numbers, corresponding to the second codes indicating images to be buffered, to the buffers in sequence (105); and when buffering the images, processing the images in the buffers in sequence on the basis of a face capturing algorithm and according to an order of the first numbers of the buffers, to obtain face images, and outputting the face images (106). The method prevents wastage of buffer resources.

9 Claims, 3 Drawing Sheets

(56) References Cited

U.S. PATENT DOCUMENTS

| | | | |
|---|---|---|---|
| 10,902,705 B1* | 1/2021 | Rose | H04W 12/72 |
| 2015/0010203 A1* | 1/2015 | Muninder | G06T 7/75 |
| | | | 382/103 |
| 2016/0261793 A1* | 9/2016 | Sivan | H04N 19/597 |
| 2016/0335475 A1* | 11/2016 | Krenzer | G06T 5/002 |
| 2017/0053435 A1* | 2/2017 | Reymann | H04N 7/183 |
| 2020/0005060 A1* | 1/2020 | Martin | G05D 1/0223 |

* cited by examiner

FACE CAPTURING METHOD AND RELATED APPARATUS

CROSS-REFERENCE TO RELATED APPLICATION

This application claims priority to Chinese Patent Application No. 201811628404.X, entitled "FACE CAPTURING METHOD AND RELATED APPARATUS" and filed on Dec. 28, 2018, the content of which is hereby incorporated by reference in its entirety.

BACKGROUND

1. Technical Field

The present disclosure generally relates to image recognition technologies field, and especially relates to a face capturing method and a related apparatus.

2. Description of Related Art

Face capture is widely used in some real scenes (such as suspect search, target tracking, etc.). At present, in a scheme of the face capture for a video stream, it is generally occurred to buffer a plurality of images, obtained by analyzing video streams, into a plurality of buffers, and then processing the images stored in the plurality of buffers by a fixed sampling way, to obtain face images, thereby a face snapshot is realized. However, it can be seen that the above face capture scheme will cause some buffers to store the images to not be processed, thus resulting in resources waste of buffers.

SUMMARY

The technical problems to be solved: in view of the shortcomings of the related art, the present disclosure provides to a face capturing method and a related apparatus which can avoid a problem of resource waste of buffers.

In a first aspect, a face capturing method according to an embodiment of the present disclosure is applied to an electronic apparatus including a plurality of buffers, each of the plurality of buffers corresponding to a first number, the face capturing method includes:

analyzing a captured first video stream to obtain a plurality of images, each of the plurality of images corresponding to a first frame number;

determining a first pattern including a plurality of first codes, each of the plurality of first codes corresponding to a second number, each second number corresponding to at least one first frame number, and a value of each of the plurality of first codes used to indicate whether an image of the first frame number corresponding to the first code is buffered;

buffering images of first frame numbers, corresponding to the first codes, indicating images to be buffered, to buffers in sequence, each buffer configured to store one image;

when buffering the images, determining a second pattern including a plurality of second codes, each of the plurality of second codes corresponding to a third number, each third number corresponding to at least one second frame number, wherein an image corresponding to the second frame number is an image of the plurality of images that is not currently buffered in the buffer, and a value of each of the plurality of second codes used to indicate whether an image of the second frame number corresponding to the second code is buffered;

buffering images of second frame numbers, corresponding to the second codes, indicating images to be buffered, to the buffers in sequence; and when buffering the images, circularly processing the images in the buffers in sequence on the basis of a face capturing algorithm and according to an order of the first numbers of the buffers, to obtain a face image, and outputting the face image.

In a second aspect, a face capturing apparatus according to an embodiment of the present disclosure is applied to an electronic apparatus including a plurality of buffers, each of the plurality of buffers corresponding to a first number, the face capturing apparatus includes;

an analyzing unit configured to analyze a captured first video stream to obtain a plurality of images, each image corresponding to a first frame number;

a determining unit configured to determine a first pattern including a plurality of first codes, each of the plurality of first codes corresponding to a second number, each second number corresponding to at least one first frame number, and a value of each of the plurality of first codes used to indicate whether an image of the first frame number corresponding to the first code is buffered;

a buffering unit configured to buffer images of first frame numbers, corresponding to the first codes, indicating images to be buffered, to buffers in sequence, each buffer configured to store one image;

the determining unit further configured to, when buffering the images, determine a second pattern including a plurality of second codes, each of the plurality of second codes corresponding to a third number, each third number corresponding to at least one second frame number, wherein an image corresponding to the second frame number is an image of the plurality of images that is not currently buffered in the buffer, and a value of each of the plurality of second codes used to indicate whether an image of the second frame number corresponding to the second code is buffered;

the buffering unit further configured to buffer images of second frame numbers, corresponding to the second codes, indicating images to be buffered, to the buffers in sequence; and a face recognition unit configured to, when buffering the images, circularly process the images in the buffers in sequence on the basis of a face capturing algorithm and according to an order of the first numbers of the buffers, to obtain a face image, and output the face image.

In a third aspect, an electronic apparatus according to an embodiment of the present disclosure includes a processor, a memory, a communication interface and one or more programs stored in the memory, the one or more programs including instructions performed by the processor to implement steps of the face capturing method in the first aspect.

In a fourth aspect, a computer readable storage medium according to an embodiment of the present disclosure is configured to store computer programs, the computer programs performed by a computer to implement some or all steps of the face capturing method in the first aspect.

In a fifth aspect, a computer product according to an embodiment of the present disclosure includes a non-instantaneous computer readable storage medium that stores computer programs therein, the computer program performed by a computer to implement some or all steps of the face capturing method in the first aspect. The computer product can be a software installation package.

It can be seen that, in an embodiment of the present disclosure, the electronic apparatus is configured to, based on the pattern, buffer the plurality of images obtained from the video stream to the buffers in sequence, and values of the plurality of first codes included in the pattern are used to indicate whether images of frame numbers corresponding the plurality of codes are buffered. In other words, it is meant that all images are not buffered, and images to not need to be processed are not buffered, so as to avoid a problem of resource waste of the buffers. Furthermore, buffering images and analyzing face images can be implemented in parallel, which can improve utilization of computing resources and a processing speed of a whole process. Finally, the electronic apparatus is configured to buffer images first based on the first pattern, and then buffer images based on the second pattern, so that the images can flexibly buffered.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

For one of ordinary skill in the related art, in order to more clearly understand a technical solution hereinafter of the present disclosure, reference will now be made in detail to embodiments, examples of which are illustrated in the accompanying drawings. In the following detailed description, numerous specific details are set forth in order to provide a thorough understanding of the subject matter presented herein. Obviously, an implementation embodiment in the description is a part of the present disclosure implementation examples, rather than the implementation of all embodiments and examples. According to the described embodiment of the present disclosure, all other embodiments obtained by one of ordinary skill in the related art on the premise of no creative work are within the protection scope of the present disclosure.

The present disclosure is described in detail below.

The terms "first", "second", etc. in the description and claims of the present disclosure and the accompanying drawings above are provided to distinguish different objects rather than describing a particular order. In addition, the terms "include" and "have" and any variations of them are intended to cover non-exclusive inclusions. For example, a process, a method, a system, a product, or a device that includes a series of steps or units is not restricted to listed steps or units, but optionally includes steps or units that are not listed, or other steps or units inherent to those processes, methods, products, or devices.

A reference to an "embodiment" herein is implied that particular features, structures or characteristics described in combination with an embodiment can be included in at least one embodiment of the present disclosure. The occurrence of the phrase at various locations in the specification does not necessarily refer to the same embodiment, nor is it an independent or alternative embodiment mutually exclusive from other embodiments. It can be explicitly and implicitly understood by one of ordinary skill in the related art that the embodiments described herein can be combined with other embodiments.

Electronic apparatuses are composed of integrated circuits, transistors, electronic tubes and other electronic components, and referred to equipments in which electronic technology software is applied to play a role. An electronic apparatus can include various handheld devices with wireless communication functions, vehicle-mounted devices, wearable devices, computing devices or other processing devices connected to wireless modems, as well as various forms of user equipments (User Equipment, UE), mobile stations (Mobile Station, MS), terminal devices, and so on.

The electronic apparatus further includes a plurality of buffers, each of the plurality of buffers is provided for storing an image, the image stored in the buffer can overwrite an image stored in the buffer at a previous time.

Figure 1:
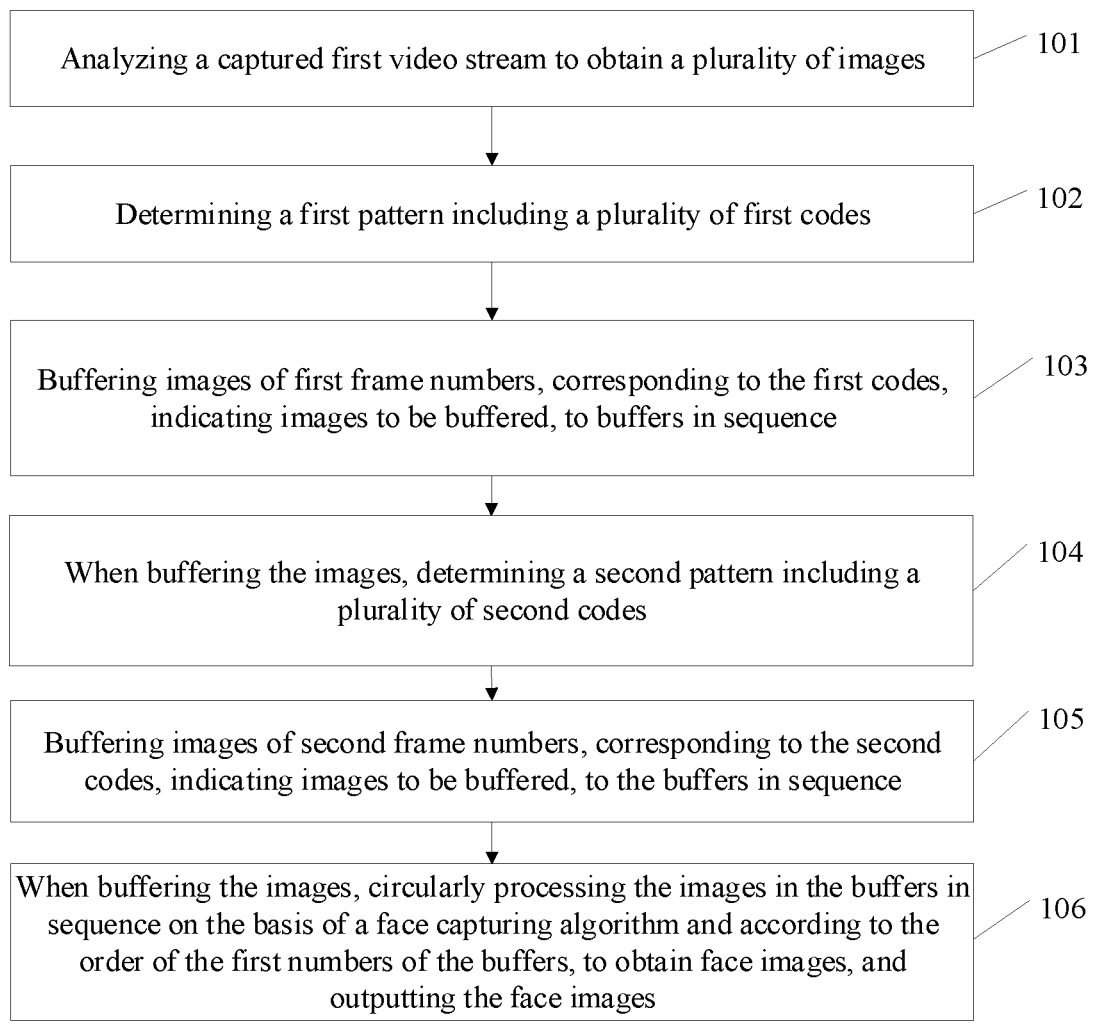
FIG. 1 is a flowchart of a face capturing method in accordance with a first embodiment of the present disclosure.

FIG. 1 illustrates a flowchart of a face capturing method in accordance with a first embodiment of the present disclosure. The face capturing method is applied to an electronic apparatus including a plurality of buffers, each of the plurality of buffers corresponding to a first number, the face capturing method includes:

Step 101, analyzing a captured first video stream to obtain a plurality of images, each image corresponding to a first frame number.

Furthermore, the first frame number is used to indicate an order in which a corresponding image is placed. The first frame number can be one, two, three, four, or some other values.

Furthermore, the first frame number of an image is obtained that each image is marked by the electronic apparatus according to an order that the plurality of images is analyzed. For example, four images are obtained by analyzing the first video stream via the electronic apparatus, the four images are analyzed in an order of an image 1, an image 2, an image 3 and an image 4, so, corresponding frame numbers of the four images include: the image 1 corresponding to a frame number 1, the image 2 corresponding to a frame number 2, the image 3 corresponding to a frame number 3, and the image 4 corresponding to a frame number 4.

Step 102, determining a first pattern including a plurality of first codes, each of the plurality of first codes corresponding to a second number, each second number corresponding to at least one first frame number, and a first value of each of the plurality of first codes used to indicate whether an image of the first frame number corresponding to the first code is buffered.

Furthermore, the electronic apparatus includes a plurality of patterns, the first pattern is one of the plurality of patterns, the pattern is a sequence consisted of a plurality of codes, such as 10101010, 10010010 and 10001000, etc. Furthermore, the code in the pattern is a binary code and can be represented by two values, one value used to indicate an image of the first frame number corresponding to the code is buffered and the other value used to indicate an image of the first frame number corresponding to the code isn't buffered. For example, when the value of the code is equal to 1, it means that the image corresponding to one is buffered; when the value of the code is equal to zero, it means that the image corresponding to zero isn't buffered. For another example, when the value of the code is equal to 1, it means that the image corresponding to one is buffered; when the value of the code is equal to −1, it means that the image corresponding to −1 isn't buffered. It should be noted that values of the binary code can be represented by other forms, which are not illustrated one by one.

For example, if a pattern is taken as 10101010, which is consisted of eight codes, a value of the first code is 1, a value of the second code is 0, a value of the third code is 1, a value of the fourth code is 0, a value of the fifth code is 1, a value of the sixth code is 0, a value of the seventh code is 1, a value of the eighth code is 0. When the value of the code is assumed to be 1, it is represented that the image corresponding to the code is buffered, while, when the value of the code is assumed to be 0, it is represented that the image corresponding to the code isn't buffered. In this way, under the pattern condition, the images respectively corresponding to the first code, the third code, the fifth code and the seventh code are needed to be buffered, while, the images respectively corresponding to the second code, the fourth code, the sixth code and the eighth code aren't needed to be buffered.

For another example, it is assumed that 24 images are obtained by analyzing the first video stream, a first pattern includes eight first codes, a value of each first code can be 1 or zero, wherein, 1 is represented an image of the first frame number corresponding to the first code is buffered, and zero is represented an image of the first frame number corresponding to the first code isn't buffered. It is assumed that the pattern is taken as 10101010, it is represented to buffer the image of the first frame number corresponding to the first code that second numbers respectively are 1, 3, 5 and 7. The images that the second number is 1 are the images that the first frame numbers respectively are 1, 9, 17. The images that the second number is 3 are the images that the first frame numbers respectively are 3, 11, 19. The images that the second number is 5 are the images that the first frame numbers respectively are 5, 13, 21. The images that the second number is 7 are the images that the first frame numbers respectively are 7, 15, 23. And then, it is represented not to buffer the image of the first frame number corresponding to the first code that second numbers respectively are 2, 4, 6 and 8. The images that the second number is 2 are the images that the first frame numbers respectively are 2, 10, 18. The images that the second number is 4 are the images that the first frame numbers respectively are 4, 12, 20. The images that the second number is 6 are the images that the first frame numbers respectively are 6, 14, 22. The images that the second number is 8 are the images that the first frame numbers respectively are 8, 16, 24.

Furthermore, the electronic apparatus includes a plurality of patterns, and the step of determining a first pattern including a plurality of first codes includes: based on a first mapping relationship between number of images and patterns, determining a first target pattern corresponding to number of the plurality of images, and taking the first target pattern as the first pattern. Furthermore, the first mapping relationship between number of images and the pattern is shown in Table 1.

TABLE 1

| number of images | patterns |
|---|---|
| 1~20 | 10101010 |
| 21~35 | 10010010 |
| 36~60 | 10001000 |
| ... | ... |

Furthermore, the electronic apparatus includes a plurality of patterns, and the step of determining a first pattern including a plurality of first codes includes: determining a target scene of the first video stream based on identification information carried by the first video stream; based on a second mapping relationship between a scene and the pattern, determining a second target pattern corresponding to the target scene; and taking the second target pattern as the first pattern.

Furthermore, the step of determining a target scene of the first video stream based on identification information carried by the first video stream includes: analyzing the identification information carried by the first video stream to obtain at least one key word; determining a scene corresponding to the at least one keyword based on a mapping relationship between keywords and scenes; taking the scene corresponding to the at least one keyword as a target scene of the first video stream.

Furthermore, the identification information is a name of the first video stream, for example, a playground surveillance video stream, a classroom surveillance video stream, a school medical clinic surveillance video, a shopping mall and movie theater surveillance video, a shopping mall and restaurant surveillance video, a shopping mall elevator surveillance video, a station ticket office surveillance video, a station check-in counter surveillance video, a waiting hall surveillance video, etc.

Furthermore, the mapping relationship between keywords and scenes and the second mapping relationship between the scene and the pattern are shown in Table 2.

TABLE 2

| keyword | scene | pattern |
|---|---|---|
| playground, classroom, school medical clinic | school | 10101010 |
| shopping mall and movie theater, shopping mall and restaurant, shopping mall elevator | shopping mall | 10010010 |
| station ticket office, station check-in counter, waiting hall | station | 10001000 |
| ... | ... | ... |

Step 103, buffering images of first frame numbers, corresponding to the first codes, indicating images to be buffered, to buffers in sequence, each buffer configured to store one image.

For example, it is assumed that 20 images are obtained by analyzing the first video stream, eight buffers, and the first pattern is taken as 10101010, wherein 1 is represented an image of the first frame number corresponding to the first code is buffered, and zero is represented an image of the first frame number corresponding to the first code isn't buffered. So, the first code corresponding to the images needed to be buffered of the first frame numbers that respectively are 1, 3, 5, 7, 9, 11, 13, 15, 17 and 19. Buffering the image with the first frame number of 1 into a buffer with the first number of 1; buffering the image with the first frame number of 3 into a buffer with the first number of 2; buffering the image with the first frame number of 5 into a buffer with the first number of 3; buffering the image with the first frame number of 7 into a buffer with the first number of 4; buffering the image with the first frame number of 9 into a buffer with the first number of 5; buffering the image with the first frame number of 11 into a buffer with the first number of 6; buffering the image with the first frame number of 13 into a buffer with the first number of 7; buffering the image with the first frame number of 15 into a buffer with the first number of 8; buffering the image with the first frame number of 17 into the buffer with the first number of 1 to overwrite the image with the frame number of 1; and buffering the image with the first frame number of 19 into the buffer with the first number of 1 to overwrite the image with the frame number of 3. The rest of the images are not buffered.

Furthermore, the step of buffering images of first frame numbers, corresponding to the first codes, indicating images to be buffered, to buffers in sequence, includes:

Step S1, according to the plurality of first encodes, determining r images to be buffered from the plurality of images obtained, the r images to be buffered corresponding to a third frame number i;

Step S2, setting an initial value of the third frame number i as 1;

Step S3, determining whether i is less than or equal to a total number m of the plurality of buffers and m is less than or equal to r, if yes, performing step S4, if no, performing step S6;

Step S4, storing a i-th image of the r images into a j-th buffer;

Step S5, assigning i+1 to i, assigning j+1 to j, and performing the step S3;

Step S6, obtaining a remainder k that i is divided by m;

Step S7, determining whether k is equal to zero, if yes, performing step S8, if no, performing step S10, Step S8, storing data of the i-th image into a m-th buffer;

Step S9, assigning i+1 to i, performing the step S6;

Step S10, storing data of the i-th image into a k-th buffer, performing the step S9.

Furthermore, an initial value of j can be 1 or other values, which is not qualified here.

Step 104, when buffering the images, determining a second pattern including a plurality of second codes, each of the plurality of second codes corresponding to a third number, each third number corresponding to at least one second frame number, wherein an image corresponding to the second frame number is an image of the plurality of images that is not currently buffered in the buffer, and a value of each of the plurality of second codes used to indicate whether an image of the second frame number corresponding to the second code is buffered.

Furthermore, before determining the second pattern including a plurality of second codes, the method further includes:

determining the total number m of the plurality of buffers, a first number n of the buffer corresponding to the image currently being buffered, a first number p of the buffer corresponding to an image being processed, wherein m is greater than n and p, n is greater than or equal to 1, and p is greater than or equal to 1;

based on m, n and p, determining number q of the buffers corresponding to the images that are buffered to not be processed, wherein q is greater than or equal to zero;

determining q less than or equal to a first preset threshold, wherein the first preset threshold is determined based on m.

Furthermore, based on m, n and p, a specific implementation method of determining number q of the buffers corresponding to the images that are buffered to not be processed, is: if p is greater than or equal to n, based on a first formula, determining number q of the buffers corresponding to the images that are buffered to not be processed, wherein the first formula is: q=m−(p−n); if p is less than n, based on a second formula, determining number q of the buffers corresponding to the images that are buffered to not be processed, wherein the second formula is: q=n−p.

For example, it is assumed that the total number of the plurality of buffers is 5, the first number of the buffer corresponding to the image currently being buffered is 2, and the first number of the buffer corresponding to the image currently being processed is 4, based on the first formula above, it can be determined that number of the buffers corresponding to the images being buffered to not be processed is: q=5−(4−2)=3. The first numbers of the buffers corresponding to the images being buffered to not be processed respectively are 1, 2 and 5, so that the result is the same as a result that is calculated based on the first formula. It is assumed that the total number of the plurality of buffers is 5, the first number of the buffer corresponding to the image currently being buffered is 4, and the first number of the buffer corresponding to the image currently being processed is 2, based on the second formula above, it can be determined that number of the buffers corresponding to the images being buffered to not be processed is: q=4−2=2. The first numbers of the buffers corresponding to the images being buffered to not be processed respectively are 3 and 4, so that the result is the same as a result that is calculated based on the second formula.

Furthermore, the step of determining the first preset threshold based on m, includes: the first preset threshold is determined based on a third formula, wherein the third formula is: s=am, s is the first preset threshold, a is a number greater than zero and less than 1. Wherein, a can be 0.2, 0.4, 0.6, 0.8 or other values, which is not qualified here.

Furthermore, the electronic apparatus includes a plurality of patterns, and the step of determining a first pattern including a plurality of first codes, includes: based on a third mapping relationship between number of the buffers and patterns, determining a third target pattern corresponding to q, and taking the third target pattern as the second pattern.

Furthermore, the third mapping relationship between number of the buffers and patterns is shown in Table 3.

TABLE 3

| number of the buffers | pattern |
| --- | --- |
| less than 0.2 m | 10101010 |
| greater than or equal to 0.2 m, and less than 0.4 m | 10010010 |
| greater than or equal to 0.4 m, and less than 0.6 m | 10001000 |
| . . . | . . . |

Furthermore, before determining a second pattern including a plurality of second codes, the method includes:

determining a total number t of the plurality of images;

determining the first frame number v of the images currently being processed;

determining v greater than or equal to a second preset threshold, wherein the second preset threshold is determined based on t.

Furthermore, determining the second preset threshold based on t, includes: the second preset threshold is determined based on a fourth formula, and the fourth formula is: z=bt, wherein, z is the second preset threshold, and b is a number greater than zero and less than 1. Wherein, b can be 0.2, 0.4, 0.6, 0.8 or other values, which is not qualified here.

Furthermore, the electronic apparatus includes a plurality of patterns, and the step of determining the first pattern including the plurality of first codes, includes: based on a fourth mapping relationship between frame numbers and patterns, determining a fourth target pattern corresponding to v, and taking the fourth target pattern as the second pattern.

Furthermore, the fourth mapping relationship between number of the buffers and patterns is shown in Table 4.

TABLE 4

| Frame number | pattern |
| --- | --- |
| less than 0.2 t | 10101010 |
| greater than or equal to 0.2 t, and less than 0.4 t | 10010010 |
| greater than or equal to 0.4 t, and less than 0.6 t | 10001000 |
| ... | ... |

Step 105, buffering images of second frame numbers, corresponding to a plurality of second codes, indicating images to be buffered, to buffers in sequence.

It should be noted that a specific implementation of the step 105 is the same as the specific implementation of the step 104 shown above, which is not described in detail here.

Step 106, when buffering the images, circularly processing the images in the buffers in sequence on the basis of a face capturing algorithm and according to an order of the first numbers of the buffers, to obtain a face image, and outputting the face image.

For example, it is assumed that there are eight buffers, successively processing the images buffered in the buffer based on the face capturing algorithm from the first number 1 to the first number 8, when the images buffered in the buffer with the first number of 8 are completed to be processed, then circularly processing the images buffered in the buffer from the first number 1 to the first number 8 in turn, until all buffered images are processed.

It can be seen that, in an embodiment of the present disclosure, the electronic apparatus is configured to, based on the pattern, buffer the plurality of images obtained from the video stream to the buffers in sequence, and values of the plurality of first codes included in the pattern are used to indicate whether images of frame numbers corresponding the plurality of codes are buffered. In other words, it is meant that all images are not buffered, and images to not need to be processed are not buffered, so as to avoid a problem of resource waste of the buffers. Furthermore, buffering images and analyzing face images can be implemented in parallel, which can improve utilization of computing resources and a processing speed of a whole process. Finally, the electronic apparatus is configured to buffer images first based on the first pattern, and then buffer images based on the second pattern, so that the images can flexibly buffered.

In an embodiment of the present disclosure, the method further includes:

when performing face capture processing on the first video stream is uncompleted, receiving a second video stream;

in a process of performing face capture processing on the first video stream, analyzing the second video stream to obtain a plurality of images of the second video stream, each of the plurality of images of the second video stream corresponding to a fourth frame number;

after performing face capture processing on the first video stream is completed, performing face capture processing on the second video stream.

Furthermore, the step of performing face capture processing on the second video stream includes an image buffering process and an image processing process. A specific implementation method of buffering images of the second video stream is the same as that of the first video stream, which is not be described here. A specific realization method of processing images of the second video stream is consistent with that of the first video stream, which is not be described here.

It can be seen that, in an embodiment of the present disclosure, a way of analyzing parallel the second video stream during performing face capture processing on the first video stream, is compared with the way of analyzing the second video stream after analyzing all the images obtained from the first video stream, it can save a time of analyzing the second video stream, improve utilization of computing resources and a processing speed of the whole process.

Figure 2:
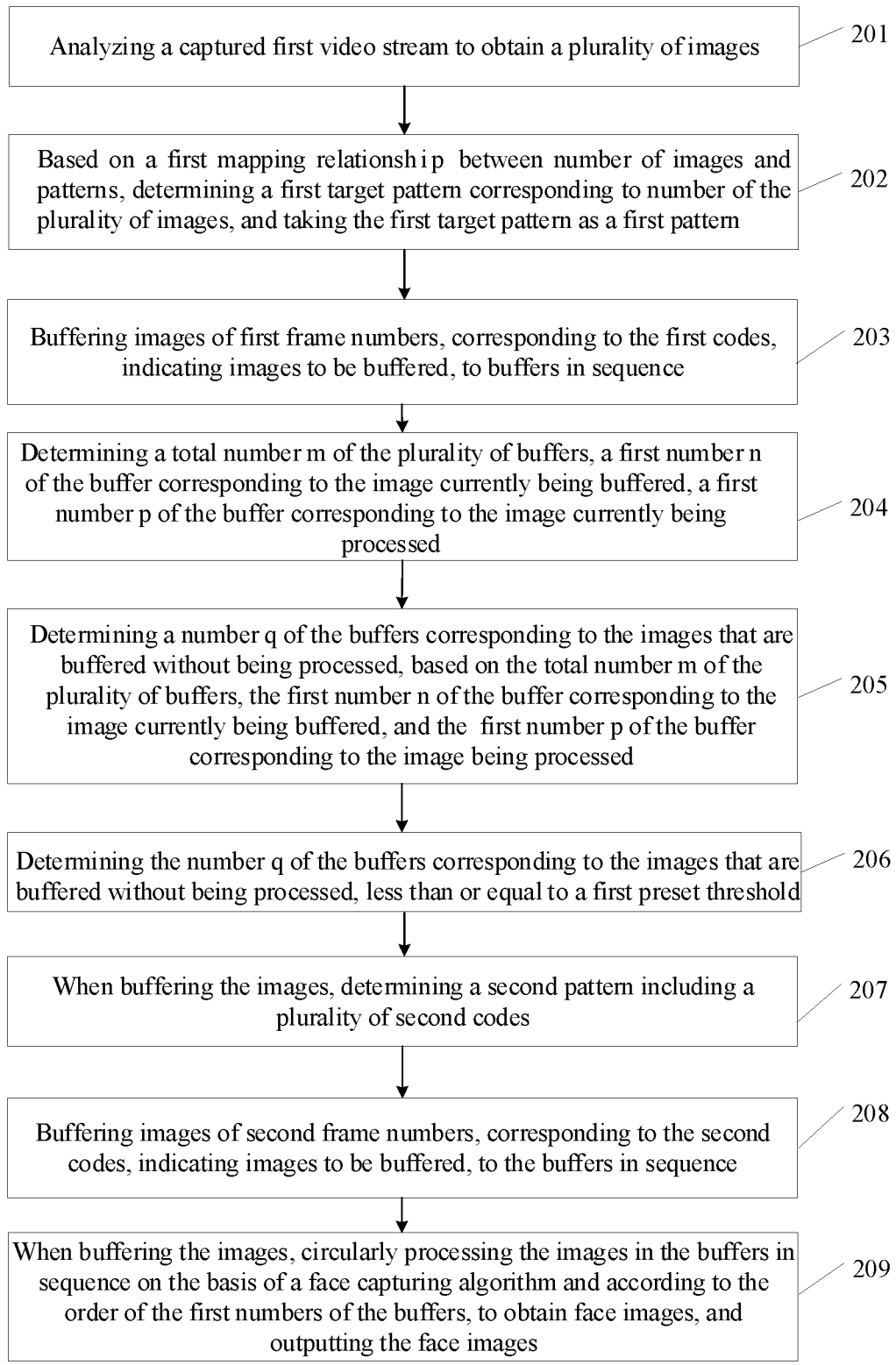
FIG. 2 is a flowchart of the face capturing method in accordance with a second embodiment of the present disclosure.

FIG. 2 illustrates a flowchart of the face capturing method in accordance with a second embodiment of the present disclosure. The face capturing method includes:

Step 201, analyzing a captured first video stream to obtain a plurality of images, each of the plurality of images corresponding to a first frame number.

Step 202, based on a first mapping relationship between number of images and patterns, determining a first target pattern corresponding to number of the plurality of images, and taking the first target pattern as the first pattern, the first pattern including a plurality of first codes.

Step 203, buffering images of first frame numbers, corresponding to the first codes, indicating images to be buffered, to buffers in sequence, each buffer configured to store one image.

Step 204, determining a total number m of the plurality of buffers, a first number n of the buffer corresponding to an image currently being buffered, a first number p of the buffer corresponding to an image currently being processed, wherein m is greater than n and p, n is greater than or equal to 1, and p is greater than or equal to 1.

Step 205, based on m, n and p, determining number q of the buffers corresponding to the images that are buffered to not be processed, wherein q is greater than or equal to zero.

Step 206, determining q less than or equal to a first preset threshold, wherein the first preset threshold is determined based on m.

Step 207, determining a second pattern including a plurality of second codes, each of the plurality of second codes corresponding to a third number, each third number corresponding to at least one second frame number, wherein an image corresponding to the second frame number is an image of the plurality of images that is not currently buffered in the buffer, and a value of each of the plurality of second codes used to indicate whether an image of the second frame number corresponding to the second code is buffered.

Step 208, buffering images of second frame numbers, corresponding to the second codes, indicating images to be buffered, to the buffers in sequence.

Step 209, when buffering the images, circularly processing the images in the buffers in sequence on the basis of a face capturing algorithm and according to an order of the first numbers of the buffers, to obtain a face image, and outputting the face image.

It should be noted that a specific implementation process of the embodiment can be referred to the specific implementation process described in the method of the first embodiment, which is not be described here.

Figure 3:
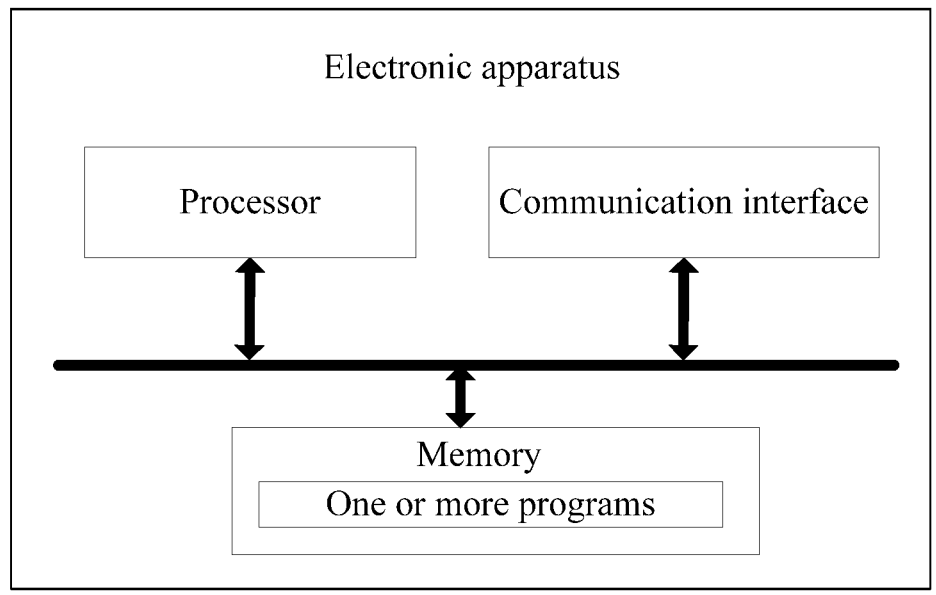
FIG. 3 is a schematic diagram of an electronic apparatus in accordance with an embodiment of the present disclosure.

Referring to FIG. 3, it is consistent with the embodiments shown in FIG. 1 and FIG. 2 above. FIG. 3 illustrates a schematic diagram of an electronic apparatus in accordance with an embodiment of the present disclosure. As shown in FIG. 3, the electronic apparatus includes a processor, a memory, a communication interface and one or more programs stored in the memory, the one or more programs including instructions performed by the processor to implement steps as followed below:

analyzing a captured first video stream to obtain a plurality of images, each of the plurality of images corresponding to a first frame number;

determining a first pattern including a plurality of first codes, each of the plurality of first codes corresponding to a second number, each second number corresponding to at least one first frame number, and a value of each of the plurality of first codes used to indicate whether an image of the first frame number corresponding to the first code is buffered;

buffering images of first frame numbers, corresponding to the first codes, indicating images to be buffered, to buffers in sequence, each buffer configured to store one image;

when buffering the images, determining a second pattern including a plurality of second codes, each of the plurality of second codes corresponding to a third number, each third number corresponding to at least one second frame number, wherein an image corresponding to the second frame number is an image of the plurality of images that is not currently buffered in the buffer, and a value of each of the plurality of second codes used to indicate whether an image of the second frame number corresponding to the second code is buffered;

buffering images of second frame numbers, corresponding to the second codes, indicating images to be buffered, to the buffers in sequence; and when buffering the images, circularly processing the images in the buffers in sequence on the basis of a face capturing algorithm and according to an order of the first numbers of the buffers, to obtain a face image, and outputting the face image.

It can be seen that, in an embodiment of the present disclosure, the electronic apparatus is configured to, based on the pattern, buffer the plurality of images obtained from the video stream to the buffers in sequence, and values of the plurality of first codes included in the pattern are used to indicate whether images of frame numbers corresponding the plurality of codes are buffered. In other words, it is meant that all images are not buffered, and images to not need to be processed are not buffered, so as to avoid a problem of resource waste of the buffers. Furthermore, buffering images and analyzing face images can be implemented in parallel, which can improve utilization of computing resources and a processing speed of a whole process. Finally, the electronic apparatus is configured to buffer images first based on the first pattern, and then buffer images based on the second pattern, so that the images can flexibly buffered In an implementation of the present disclosure, the electronic apparatus includes a plurality of patterns, in an aspect of determining a first pattern including a plurality of first codes, the one or more programs above includes instructions specifically for performing the following step:

based on a first mapping relationship between number of images and patterns, determining a first target pattern corresponding to number of the plurality of images, and taking the first target pattern as the first pattern.

In an implementation of the present disclosure, the electronic apparatus includes a plurality of patterns, in an aspect of determining a first pattern including a plurality of first codes, the one or more programs above includes instructions specifically for performing the following steps:

determining a target scene of the first video stream based on identification information carried by the first video stream;

based on a second mapping relationship between scenes and patterns, determining a second target pattern corresponding to the target scene; and taking the first target pattern as the first pattern.

In an implementation of the present disclosure, before determining the second pattern including the plurality of second codes, the one or more programs above includes instructions specifically for performing the following steps:

determining a total number m of the plurality of buffers, a first number n of the buffer corresponding to an image currently being buffered, a first number p of the buffer corresponding to an image being processed, wherein m is greater than n and p, n is greater than or equal to 1, and p is greater than or equal to 1;

based on m, n and p, determining number q of the buffers corresponding to the images that are buffered to not be processed, wherein q is greater than or equal to zero;

determining q less than or equal to a first preset threshold, wherein the first preset threshold is determined based on m.

In an implementation of the present disclosure, before determining the second pattern including the plurality of second codes, the one or more programs above includes instructions specifically for performing the following steps:

determining a total number t of the plurality of images;

determining a first frame number v of images currently being processed;

determining v greater than or equal to a second preset threshold, wherein the second preset threshold is determined based on t.

It should be noted that a specific implementation process of the embodiment can be referred to the specific implementation process described in the embodiment of the method above, which is not be described here.

The embodiment of the present disclosure can divide functional units of the electronic apparatus according to examples of the method shown above. For example, functional units can be divided according to each function, or two or more functions can be integrated in a single processing unit. The integrated unit can be realized either in a form of hardware or in a form of software functional units. It should be noted that divisions of units in embodiments of the present disclosure is schematic, which is only a logical function division, so that it can be divided by other division methods in actual implementations.

Figure 4:
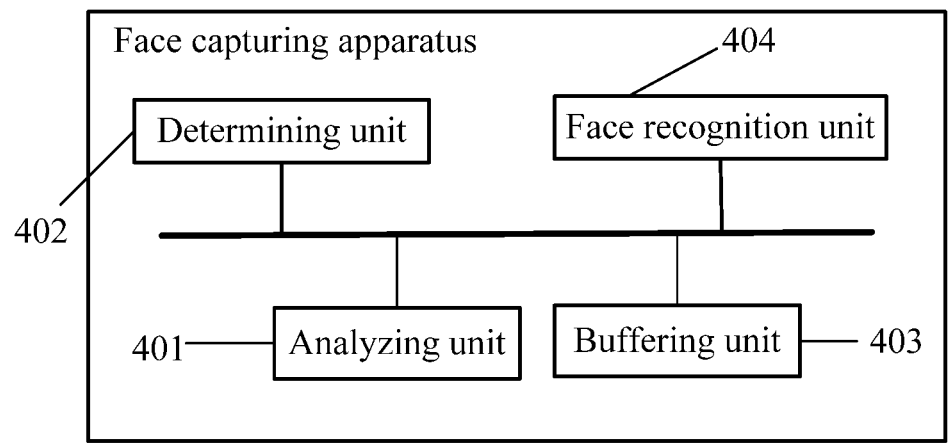
FIG. 4 is a schematic diagram of a face capturing apparatus in accordance with an embodiment of the present disclosure.

The followings below are an embodiment of an electronic apparatus of the present disclosure, which is used to implement the method of the present disclosure. FIG. 4 illustrates a schematic diagram of a face capturing apparatus in accordance with an embodiment of the present disclosure. The face capturing apparatus is applied to an electronic apparatus including a plurality of buffers, each of the plurality of buffers corresponding to a first number. The face capturing apparatus includes:

an analyzing unit 401 configured to analyze a captured first video stream to obtain a plurality of images, each image corresponding to a first frame number;

a determining unit 402 configured to determine a first pattern including a plurality of first codes, each of the plurality of first codes corresponding to a second number, each second number corresponding to at least one first frame number, and a value of each of the plurality of first codes used to indicate whether an image of the first frame number corresponding to the first code is buffered;

a buffering unit 403 configured to buffer images of first frame numbers, corresponding to the first codes, indicating images to be buffered, to buffers in sequence, each buffer configured to store one image;

the determining unit 402 further configured to, when buffering the images, determine a second pattern including a plurality of second codes, each of the plurality of second codes corresponding to a third number, each third number corresponding to at least one second frame number, wherein an image corresponding to the second frame number is an image of the plurality of images that is not currently buffered in the buffer, and a value of each of the plurality of second codes used to indicate whether an image of the second frame number corresponding to the second code is buffered;

the buffering unit 403 further configured to buffer images of second frame numbers, corresponding to the second codes, indicating images to be buffered, to the buffers in sequence; and a face recognition unit 404 configured to, when buffering the images, circularly process the images in the buffers in sequence on the basis of a face capturing algorithm and according to an order of the first numbers of the buffers, to obtain a face image, and output the face image.

It can be seen that, in an embodiment of the present disclosure, the electronic apparatus is configured to, based on the pattern, buffer the plurality of images obtained from the video stream to the buffers in sequence, and values of the plurality of first codes included in the pattern are used to indicate whether images of frame numbers corresponding the plurality of codes are buffered. In other words, it is meant that all images are not buffered, and images without needing to be processed are not buffered, so as to avoid a problem of resource waste in the buffers. Furthermore, buffering images and analyzing face images are implemented in parallel, which can improve utilization of computing resources and a processing speed of a whole process. Finally, the electronic apparatus is configured to buffer images first based on the first pattern, and then buffer images based on the second pattern, so that the images can flexibly buffered.

In an implementation of the present disclosure, the electronic apparatus includes a plurality of patterns, in an aspect of determining a first pattern including a plurality of first codes, the determining unit 402 is further configured to:

based on a first mapping relationship between number of images and patterns, determine a first target pattern corresponding to number of the plurality of images, and take the first target pattern as the first pattern.

In an implementation of the present disclosure, the electronic apparatus includes a plurality of patterns, in an aspect of determining a first pattern including a plurality of first codes, the determining unit 402 is further configured to:

determine a target scene of the first video stream based on identification information carried by the first video stream;

based on a second mapping relationship between scenes and patterns, determine a second target pattern corresponding to the target scene; and take the first target pattern as the first pattern.

In an implementation of the present disclosure, before determining the second pattern including the plurality of second codes, the determining unit 402 is further configured to:

determine a total number m of the plurality of buffers, a first number n of the buffer corresponding to an image currently being buffered, a first number p of the buffer corresponding to an image being processed, wherein m is greater than n and p, n is greater than or equal to 1, and p is greater than or equal to 1;

based on m, n and p, determine number q of the buffers corresponding to the images that are buffered to not be processed, wherein q is greater than or equal to zero;

determine q less than or equal to a first preset threshold, wherein the first preset threshold is determined based on m.

In an implementation of the present disclosure, before determining the second pattern including the plurality of second codes, the determining unit 402 is further configured to:

determine a total number t of the plurality of images;

determine a first frame number v of images currently being processed;

determine v greater than or equal to a second preset threshold, wherein the second preset threshold is determined based on t.

It should be noted that the analyzing unit 401, the determining unit 402, and the face recognition unit 404 can be implemented by a processor, and the buffering unit 403 can be implemented by a memory.

A computer readable storage medium according to an embodiment of the present disclosure is configured to store computer programs for electronic data interchange, the computer programs performed by a computer to implement some or all steps of any of the face capturing methods described in the above method embodiments.

A computer product according to an embodiment of the present disclosure includes a non-instantaneous computer readable storage medium that stores computer programs therein, the computer program performed by a computer to implement some or all steps of any of the face capturing methods described in the above method embodiments. The computer product can be a software installation package.

It should be noted that, for a simple description, the above embodiments of each method are expressed as a series of action combinations. However, one of ordinary skill in the related art should be known that the present disclosure is not limited by a sequence of actions in the description mentioned above, certain steps can be performed in other orders or simultaneously according to present disclosure. Furthermore, one of ordinary skill in the related art should be also known that embodiments described in the specification are all preferred examples and the actions and modules involved are not necessarily obligatory for the present disclosure.

In the above embodiments, the description of each embodiment has its own emphasis. For a part without being detailed in one embodiment, please refer to a relevant description of other embodiments.

What is claimed is:

1. A face capturing method applied to an electronic apparatus comprising a plurality of buffers, each of the plurality of buffers corresponding to a first number, the face capturing method comprising:

analyzing a captured first video stream to obtain a plurality of images, each of the plurality of images corresponding to a first frame number;

determining a first pattern comprising a plurality of first codes, each of the plurality of first codes corresponding to a second number, each second number corresponding to at least one first frame number, and a value of each of the plurality of first codes used to indicate whether an image of the first frame number corresponding to the first code is buffered;

buffering images of first frame numbers, corresponding to the first codes, indicating images to be buffered, to buffers in sequence, each buffer configured to store one image;

when buffering the images, determining a second pattern comprising a plurality of second codes, each of the plurality of second codes corresponding to a third number, each third number corresponding to at least one second frame number, wherein an image corresponding to the second frame number is an image of the plurality of images that is not currently buffered in the buffer, and a value of each of the plurality of second codes used to indicate whether an image of the second frame number corresponding to the second code is buffered;

buffering images of second frame numbers, corresponding to the second codes, indicating images to be buffered, to the buffers in sequence; and when buffering the images, circularly processing the images in the buffers in sequence on the basis of a face capturing algorithm and according to an order of the first numbers of the buffers, to obtain face images, and outputting the face images.

2. The face capturing method as claimed in claim 1, wherein the electronic apparatus comprising a plurality of patterns, the determining a first pattern comprising the plurality of first codes comprises:

based on a first mapping relationship between number of images and the patterns, determining a first target pattern corresponding to number of the plurality of images, and taking the first target pattern as the first pattern.

3. The face capturing method as claimed in claim 1, wherein the electronic apparatus comprising a plurality of patterns, the determining a first pattern comprising the plurality of first codes comprises:

determining a target scene of the first video stream based on identification information carried by the first video stream;

based on a second mapping relationship between scenes and the patterns, determining a second target pattern corresponding to the target scene; and taking the second target pattern as the first pattern.

4. The face capturing method as claimed in claim 1, wherein before determining the second pattern comprising the plurality of second codes, the method further comprises:

determining a total number in of the plurality of buffers, a first number n of the buffer corresponding to an image currently being buffered, a first number p of the buffer corresponding to an image being processed, wherein in is greater than n and p, n is greater than or equal to 1, and p is greater than or equal to 1;

based in, n and p, determining a number q of the buffers corresponding to images that are buffered without being processed, wherein q is greater than or equal to zero;

determining q less than or equal to a first preset threshold, determining the first preset threshold based on in.

5. The face capturing method as claimed in claim 1, wherein before determining the second pattern comprising the plurality of second codes, the method further comprises:

determining a total number t of the plurality of images;

determining a first frame number v of an image that has been processed currently;

determining v greater than or equal to a second preset threshold, and determining the second preset threshold based on t.

6. A face capturing apparatus applied to an electronic apparatus comprising a plurality of buffers, a processor, a memory, a communication interface and one or more programs stored in the memory, the one or more programs comprising instructions performed by the processor, each of the plurality of buffers corresponding to a first number, the face capturing apparatus comprising:

an analyzing unit implemented by the processor and configured to analyze a captured first video stream to obtain a plurality of images, each image corresponding to a first frame number;

a determining unit implemented by the processor and configured to determine a first pattern comprising a plurality of first codes, each of the plurality of first codes corresponding to a second number, each second number corresponding to at least one first frame number, and a value of each of the plurality of first codes used to indicate whether an image of the first frame number corresponding to the first code is buffered;

a buffering unit implemented by the memory and configured to buffer images of first frame numbers, corresponding to the first codes, indicating images to be buffered, to buffers in sequence, each buffer configured to store one image;

the determining unit further configured to, when buffering the images, determine a second pattern comprising a plurality of second codes, each of the plurality of second codes corresponding to a third number, each third number corresponding to at least one second frame number, wherein an image corresponding to the second frame number is an image of the plurality of images that is not currently buffered in the buffer, and a value of each of the plurality of second codes used to indicate whether an image of the second frame number corresponding to the second code is buffered;

the buffering unit further configured to buffer images of second frame numbers, corresponding to the second codes, indicating images to be buffered, to the buffers in sequence; and a face recognition unit implemented by the processor and configured to, when buffering the images, circularly process the images in the buffers in sequence on the basis of a face capturing algorithm and according to an order of the first numbers of the buffers, to obtain face images, and outputting the face images.

7. The face capturing apparatus as claimed in claim 6, wherein the electronic apparatus comprising a plurality of patterns, in an aspect of (wherein the) determining the first pattern comprising a plurality of first codes, the determining unit is further configured to:

based on a first mapping relationship between number of images and the patterns, determine a first target pattern corresponding to number of the plurality of images, and take the first target pattern as the first pattern.

8. The face capturing apparatus as claimed in claim 6, wherein the electronic apparatus comprising a plurality of patterns, in an aspect of (wherein the) determining the first pattern comprising a plurality of first codes, the determining unit is further configured to:

determine a target scene of the first video stream based on identification information carried by the first video stream;

based on a second mapping relationship between scenes and the patterns, determine a second target pattern corresponding to the target scene;

take the first target pattern as the first pattern.

9. An electronic apparatus comprising a processor, a memory, a communication interface and one or more programs stored in the memory, the one or more programs comprising instructions performed by the processor to implement a face capturing method, the method applied to an electronic apparatus comprising a plurality of buffers, each of the plurality of buffers corresponding to a first number, the face capturing method comprising:

analyzing a captured first video stream to obtain a plurality of images, each of the plurality of images corresponding to a first frame number;

determining a first pattern comprising a plurality of first codes, each of the plurality of first codes corresponding to a second number, each second number corresponding to at least one first frame number, and a value of each of the plurality of first codes used to indicate whether an image of the first frame number corresponding to the first code is buffered;

buffering images of first frame numbers, corresponding to the first codes, indicating images to be buffered, to buffers in sequence, each buffer configured to store one image;

when buffering the images, determining a second pattern comprising a plurality of second codes, each of the plurality of second codes corresponding to a third number, each third number corresponding to at least one second frame number, wherein an image corresponding to the second frame number is an image of the plurality of images that is not currently buffered in the buffer, and a value of each of the plurality of second codes used to indicate whether an image of the second frame number corresponding to the second code is buffered;

buffering images of second frame numbers, corresponding to the second codes, indicating images to be buffered, to the buffers in sequence; and when buffering the images, circularly processing the images in the buffers in sequence on the basis of a face capturing algorithm and according to an order of the first numbers of the buffers, to obtain face images, and outputting the face images.

* * * * *